United States Patent [19]

Haas et al.

[11] 3,987,696

[45] Oct. 26, 1976

[54] DIE PRESS WITH MOVABLE DIE CARRIAGE HAVING CONTROLS THEREON

[75] Inventors: Edgar Haas, New York, N.Y.; Edward Kottsieper, Dresden Mills, Maine

[73] Assignee: Herman Schwabe Industries, Brooklyn, N.Y.

[22] Filed: Mar. 5, 1975

[21] Appl. No.: 555,523

[52] U.S. Cl. .................................. 83/532; 83/541; 83/DIG. 1
[51] Int. Cl.² ......................................... B26F 1/40
[58] Field of Search ............... 83/532, 541, DIG. 1, 83/562, 563

[56] References Cited
UNITED STATES PATENTS

| | | | |
|---|---|---|---|
| 681,811 | 9/1901 | Parsons | 83/562 |
| 776,418 | 11/1904 | Parsons | 83/562 |
| 1,943,133 | 1/1934 | Mayle | 83/532 X |
| 2,785,746 | 3/1957 | Mathews | 83/532 |
| 3,178,976 | 4/1965 | Kraut | 83/532 X |
| 3,357,288 | 12/1967 | Goodman et al. | 83/562 X |

*Primary Examiner*—J. M. Meister

[57] ABSTRACT

A die press for performing operations on material includes a planar support upon which material is placed and a pressure member movable toward and away from the support. Means for moving the pressure member are provided as well as means for controlling the pressure member moving means. A die carriage upon which a die is mounted is situated between the pressure member and the support and is movable relative to the support in first, second and third directions, one of which is the direction of movement of the pressure member. The linkage for mounting the die carriage maintains the die carriage in the plane of the support throughout the movement thereof. For safety purposes the control means is situated on the die carriage at a portion thereof remote from the path of movement of the pressure member. Preferably, the control means includes a pair of switches which require simultaneous activation in order to energize the pressure member moving means.

11 Claims, 4 Drawing Figures

DIE PRESS WITH MOVABLE DIE CARRIAGE HAVING CONTROLS THEREON

The present invention relates to die presses and in particular, to a die press having a novel die carriage which is movable in three directions, is provided with a mechanical linkage which maintains the die parallel to the material support and which has the controls for the pressure member mounted on the die carriage.

Die presses are used in a variety of industries to cut or otherwise impress sheets of material from which a variety of different products are formed. For instance, in the glove industry, die presses are utilized to cut sheet material into required shapes. The cutouts are then sewn together to form the palms and fingers of the gloves.

A die press includes a support, which is a planar surface, upon which the material to be cut or otherwise impressed is placed. Normally, a plurality of sheets of material are placed on the support, such that they can be simultaneously cut. A pressure member is located above the material on the support and is movable toward and away from the support by mechanical means provided for this function. A die is placed between the pressure member and the material. The die consists of metal fashioned into the outline of the configuration which is to be cut or impressed into the material. A control, generally in the form of a switch, is provided to energize the means for moving the pressure member, such that the pressure member is brought down into engagement with the die so as to force the die through the sheet material upon which the operation is to be performed.

A substantial amount of force is developed by the pressure member such that the die can be moved through the material to perform the cut or impression. Because of this, a safety hazard exists in that the operator may inadvertently leave his hands in the path of movement of the die or the pressure member and when the pressure member is moved the operator's hand may be injured. Accordingly, it has become common to provide, in presses of this type, two-handed controls, such that two buttons must be simultaneously pressed or two triggers simultaneously squeezed, each of which can be operated only by a different hand of the operator, thus ensuring that the operator's hands are not in a dangerous position during actuation of the pressure member. Because of this safety feature the operator is required to move the die into the desired position relative to the material and pressure member and then remove his hands from the die and place them on the controls (situated on another portion of the press away from the pressure member and die carriage) in order to energize the pressure member moving means. This method of operating the press, although safe, requires substantially more time than methods used previously, thereby reducing the productivity of the die.

In order to fully utilize the material and reduce waste, the die position must be shiftable relative to the sheet material being worked upon in order that operations may be performed on any area of the material. The die is therefore often mounted on a movable die carriage, such that the relatively heavy dies may be moved easily with respect to the material. However, this requires a relatively complex mechanical linkage between the die carriage and the remainder of the press because the die carriage must be maintained in a plane substantially parallel to the surface of the support throughout the movement thereof so that the operation can be performed on any area of the material.

In addition, it is desirable that the die carriage be movable to a position wherein the operator cannot accidently get his hands caught when the die is removed from the carriage and replaced by a different die. This requires that the die carriage and the pressure member be movable relative to each other such that the die can be removed and replaced when it is situated out of the path of movement of the pressure member.

It is, therefore, a prime object of the present invention to provide a die press having a movable die carriage wherein die positioning, activation of the pressure member and removal of the die can all be performed out of the path of movement of the pressure member thereby assuring the safe operation of the press.

It is a second object of the present invention to provide a die press with a movable die carriage having the pressure member control means mounted thereon at a position remote from the path of movement of the pressure member, such that positioning of the die carriage and operation pressure member controls may be safely performed from the same portion of the die carriage, thereby eliminating the necessity for the operataor to shift his hands from one portion of the press to another during operation thereof.

It is a further object of the present invention to provide a die press having a die carriage which is movable in three orthogonal directions, such that the die may be located over any area of the material.

It is another object of the present invention to provide a die press having a movable die carriage wherein the mechanical linkage to which the die carriage is mounted maintains the die substantially parallel to the surface of the support throughout the movement of the carriage.

It is still a further object of the present invention to provide a die press having a movable die carriage wherein the controls for the pressure member are a pair of buttons or triggers which must be simultaneously actuated by the operator in order to initiate movement of the pressure member.

It is still another object of the present invention to provide a die press having a movable die carriage wherein the die carriage and the pressure member are movable relative to each other, such that the die can be positioned at a location remote from the path of movement of the pressure member for safe removal of the die.

In accordance with the present invention, a die press for performing operations on material is provided including a planar support upon which sheets of material are placed. A pressure member located above the support is movable toward and away from the support by a mechanical moving means which are energized by the pressure member control means. The pressure member control means preferably comprise a pair of buttons or triggers which must be depressed simultaneously to actuate the pressure member moving means. A die carriage upon which a die is mounted is situated between the pressure member and the support and is movable relative to the support in first, second and third orthogonal directions, at least one of which is the direction of movement of the pressure member. The die carriage is mounted on a mechanical linkage which maintains the die carriage in a plane substantially parallel to the plane of the support throughout the movement of the die carriage. The control means are situated on the die carriage at a portion thereof remote from the path of movement of the member.

Since the pressure member control means are situated on the die carriage, the operator may position the die carriage by holding the control means or a handle upon which the control means are situated, such that removal of the operator's hands from one portion of the press after positioning of the die and placement of the operator's hands on another portion of the press in order to actuate the pressure member is no longer necessary. This substantially reduces the amount of time necessary to perform each operation, thereby enhancing the productivity of the press. In addition, since the control means are located on the die carriage at a portion thereof which is remote from the path of movement of the pressure member, the operator's hands, when the controls are manipulated, are safely away from the die and pressure member thereby assuring completely safe operation of the press.

The die carriage, because it is mounted for movement in three orthogonal directions permits the die to be moved relative to the material, such that the operation may be performed on any area of the material. In addition, the mechanical linkage to which the die carriage is mounted not only supports a substantial amount of the weight of the die, such that movement thereof is greatly facilitated, but also maintains the die carriage in a plane subtantially parallel to the support at all positions thereof, such that the operation may be performed on any portion of the material.

Safe removal and replacement of the die on the die carriage requires that the die, during removal from the carriage, be positionable relative to the pressure member, such that it is not in the path of travel of the pressure member. In order to achieve this relative positioning during die replacement, the present invention has a pressure member which is additionally movable in a plane parallel to the material support. As a result, the pressure member can be moved to a position which is not above the die on the die carriage when the die is being replaced.

To the accomplishment of the above and to such other objects as may hereinafter appear, the present invention relates to a die press having a movable die carriage with controls thereon as defined by the appended claims and as described in the specification taken together with the drawings wherein like numerals refer to like parts and in which:

Figure 1:
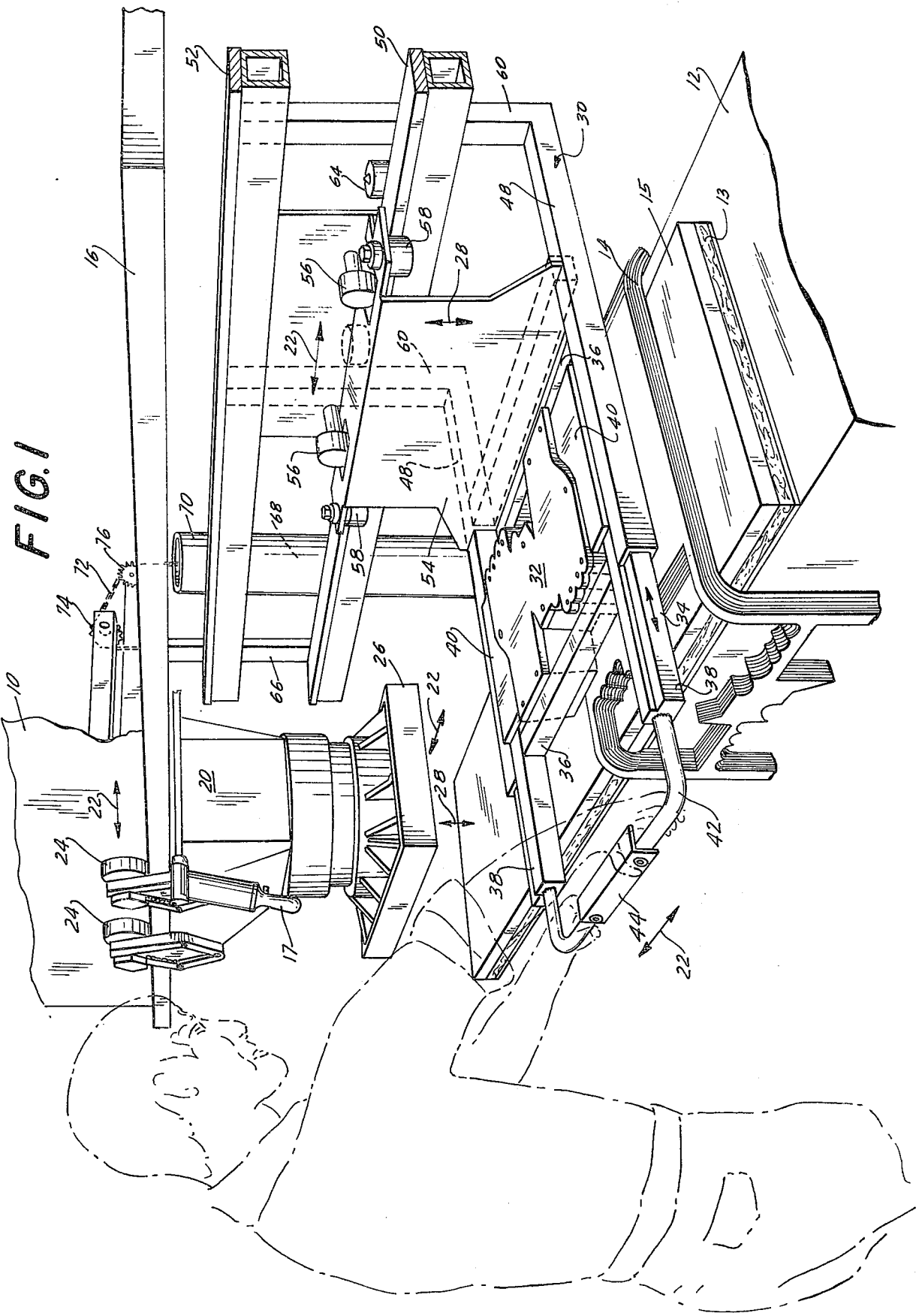
FIG. 1 is an isometric view of a preferred embodiment of the present invention.

As shown in FIG. 1, the die press of the present invention includes a housing 10 (only a portion of which is shown) situated over a support 12 upon which is a cutting surface comprising a layer of rigid material 13 and a layer of resilient material 15 such as plastic. The sheets of material 14 upon which the operation is to be performed are placed upon layer 15, one on top of the other, such as to form a single multi-layered sheet. Housing 10 consists of a plurality of upstanding side members (not shown) and a horizontal member 16 extending between upstanding members in a plane parallel to the surface of support 12. Horizontal member 16 forms a track or guide rail upon which a pressure member 20 can be moved in the horizontal direction shown by arrows 22. Movement of pressure member 20 along member 16 is facilitated by means of two sets of rolls 24 (only the front set being visible in FIG. 1) which rest on the upper surface of member 16 and are designed to ride along the top surface of member 16.

Mechanical moving means (not shown) may be provided to move pressure member 20 along member 16. As an alternative, the pressure member 20 may be manually moved along member 16. In either case, means are provided (not shown) for mechanically moving the face portion 26 of pressure member 20 toward and away from support 12 in a vertical direction (as indicated by arrows 28) to perform the cutting operation.

A die carriage 30 is provided in the plane between pressure member 20 and support 12. A die 32 is mounted on carriage 30. The linkage connecting the die carriage 30 to housing 10 permits the die carriage to be movable relative to housing 10 in each of the three orthogonal directions indicated by arrows 22, 28 and 34, respectively. This enables the operator to move die 32 to any desired position relative to material 14. The operator positions the die relative to material 14 by manipulating die carriage 30 and then moves pressure member 20 along horizontal member 16 until it is located above the die. This movement may be accomplished manually but preferably is achieved through the actuation of a mechanical means for horizontally moving the pressure member. Controls for actuating the means for horizontally moving the pressure member are provided. Preferably these controls are the same controls as the controls which are provided to move the face portion 26 of pressure member 20 in a downward direction to engage the die and push the die through the material to cut or otherwise impress the material. Such a control system is explained in detail in our co-pending application Ser. No. 554,906 entitled DIE PRESS CONTROL APPARATUS, filed Mar. 3, 1975. After the pressure head has returned to the original vertical position, the operator moves the material or the carriage or both until the die is again in position for the operation. The operator again manipulates the controls to move the pressure member 20 relative to member 16 until pressure member 20 is overhead the die. Once properly aligned, the face portion 26 is brought down into engagement with the die such that the die is pushed through the material and the second operation performed. The operator continues in a similar manner until all of the operations have been performed.

If different operations are to be performed, the die may be replaced by a different die. The pressure member 20 is moved along horizontal member 16 until it is out of alignment with the die being replaced. The die can then be replaced by lifting it off the die carriage and a new die may be substituted for it without hazard to the operator as the pressure member, should it accidentially be activated, is not in position such that the downward movement thereof could injure the operator by crushing his hand.

As seen in the drawings, the die carriage 30 of the present invention comprises a pair of cross bars 36 which, along with two of the opposite side members 38 of the carriage 30, form a cradle for the die. Die 32 is formed of a metal outline of the pattern to be cut or otherwise impressed on the material which is mounted between a pair of members 40 which are designed to extend outwardly over the side members 38 such that the die rests on member 38 in cradle-like fashion. For illustrative purposes, die 32 is shown to be a die for cutting patterns from material which will eventually become the palm of a glove.

Figure 2:
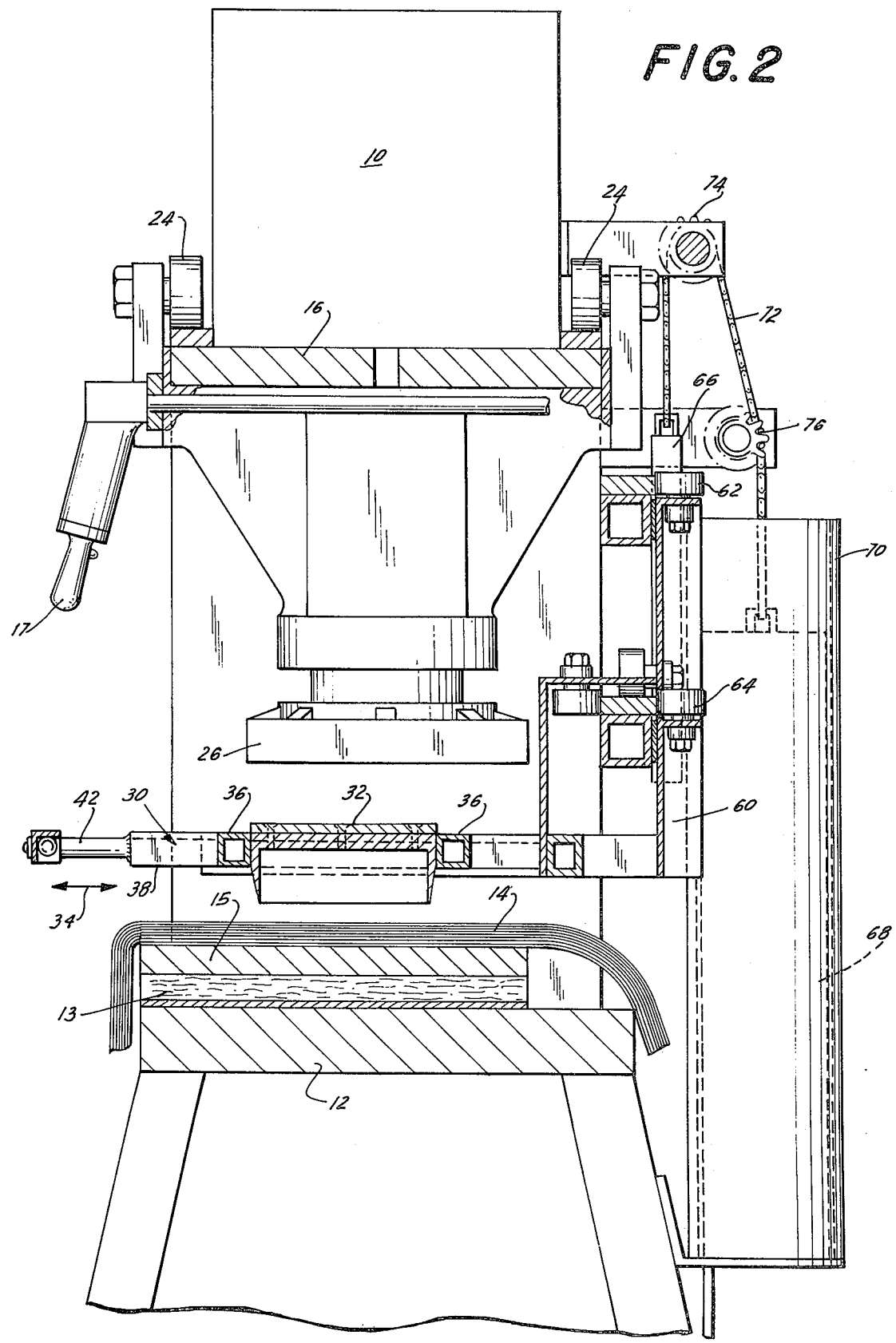
FIG. 2 is a side elevational view of the preferred embodiment of the present invention.
Figure 3:
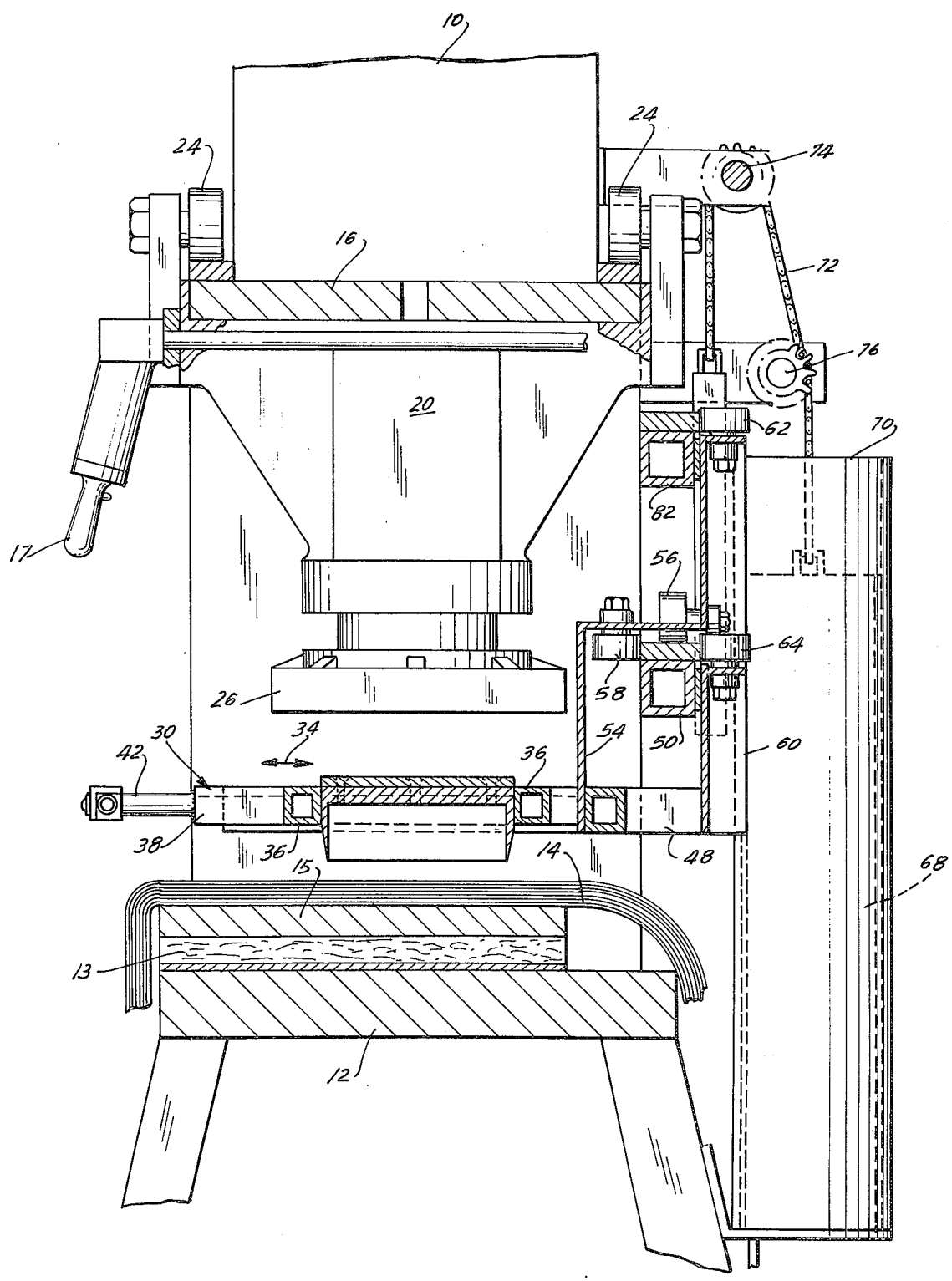
FIG. 3 is a view similar to FIG. 2 but showing the die carriage in a different position with respect to the pressure member.
Figure 4:
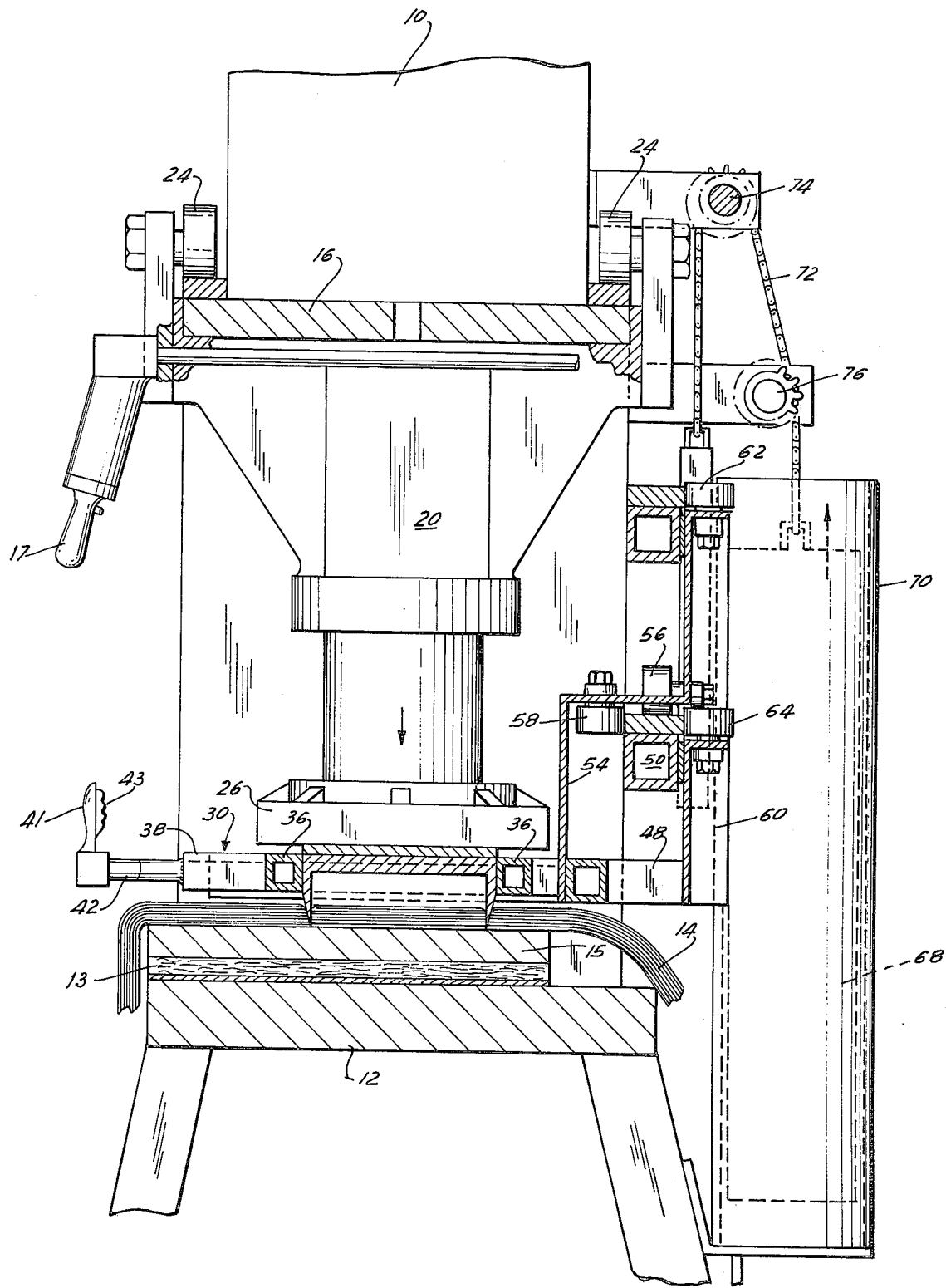
FIG. 4 is a view similar to FIG. 2 showing the pressure head in cutting position.

Side members 38 are slidingly connected to the remainder of the press by a mechanical linkage which is described in detail below. The operator's side of the carriage has mounted thereon a handle 42 which is grasped by the operator. The handle has a pair of depressible push buttons 44 situated therein. In operation, the operator grasps handle 42 with both of his hands. The operator by manipulating the handle guides the die carriage, such that the die is positioned directly over the portion of the material upon which the operation is to be performed. In the control system of the aforementioned application, the operator first depresses a single button; the left button far leftward horizontal movement of the pressure member or the right button for rightward movement. When the desired horizontal position is achieved, the push buttons 44 are simultaneously depressed to initiate vertical movement. Each of the buttons 44 is connected to a vertical movement switch (not shown) utilized to initiate vertical movement. The switches are operably connected in series, such that closing of both switches activates the moving means for pressure member 20 to move the face portion 26 of pressure member 20 downwardly to engage the die and push the die through the material, thereby performing the operation. When the operation is completed, the operator releases the buttons, thereby causing the pressure member face portion 26 to move upwardly towards member 16. The operator then repositions the die carriage over the next portion of the material upon which the operation is to be performed. Pressure member 20 is then moved along member 16 by manipulating one of the buttons on handle 42 until member 20 is aligned with the die and the buttons are again depressed simultaneously to bring the face portion 26 of pressure member 20 into engagement with the die, such that the operation is performed. Therefore, manipulation of the die carriage, horizontal positioning pressure member 20 and activation of the moving means for the vertical movement of the face portion 26 are each performed without the operator changing the positioning of his hands. This significantly reduces the time necessary to perform each operation. In addition, since the buttons 44 are placed on the die carriage at a position which is remote from the path of vertical movement of the face portion 26 of pressure member 20, the operator cannot injure his hands because, before the vertical movement of pressure member 20 can be initiated, the operator's hands must be placed on buttons 44 which are safely out of the way of the movement of the pressure member. The positional relationship between handle 42, die 32 and pressure member 20 is best seen in FIGS. 2–4 which clearly show that handle 42 is remote from the path of vertical movement of pressure member 20 during the cutting operation.

Side members 38 are slidably connected to the remainder of the die press by means of a mechanical linkage including side bars 48. Bars 48 are movably connected to a pair of parallel horizontal bars 50, 52 which extend across the entire length of the die press and are supported by support brackets (not shown) slidably connected to the upstanding side members of housing 10 for movement in vertical direction. A cross plate 54 is mounted between bars 48 and extends in a vertical direction from bars 48 to bar 50 to which it is movably connected by rollers 56 and 58. Rollers 56 roll along the top surface of bar 50 whereas rollers 58 roll along the side of bar 50. The rear portion of each of bars 48 is connected to upstanding section 60 which extends to bar 52 to which it is movably connected by rollers 62. In addition, a roller 64 is mounted on each section 60 to roll along the rear surface of bar 50. Suitable stops (not shown) are provided to limit the movement of the carriage along the horizontal bars.

Horizontal bars 50 and 52 are connected together by a number of vertical connectors 66, only one of which is shown in FIG. 1. The entire assembly of die carriage, horizontal bars 50, 52 and connectors 66 is vertically movable with respect to support 12. Such movement is required, as shown in FIGS. 3 and 4 when the pressure member descends to push the die through the material. For a proper cut, it is necessary for the die to be maintained in a plane parallel to support 12 at all positions thereof. This is accomplished by having connectors 66 movably mounted to the press along a vertical direction.

A counterweight 68 is slidably mounted within the enclosure 70 and connected to one of the connectors 66 by a chain 72. Chain 72 passes over sprockets 74 and 76 to provide smooth movement of counterweight 68. Thus, the entire assembly can be moved vertically with relatively little effort while the die is always maintained in the parallel position.

The die is movable in three orthogonal directions. As shown in FIGS. 2 and 3, die 32 can be moved along the direction shown by arrows 34 towards and away from the operator. As shown in FIG. 1, the die can be moved horizontally along the direction shown by arrows 22. As shown in FIG. 4, the die can be moved vertically with respect to support 12.

As can be seen by comparison of the figures, the die carriage 30 and the die 32 mounted thereon are always maintained in a plane substantially parallel to the surface of support 12 throughout the movement of the die carriage. This is highly preferred, as it is necessary to perform the operation with the cutting edges of the die vertical to the support, such that a substantially vertical cut is produced.

It should be noted that although the control means of the present invention is illustrated in FIGS. 1–3 as a horizontal handle with a pair of push buttons, a pair of upstanding spaced handle members 41 and triggers 43 as shown in FIG. 4 could also be utilized. These types of control means are interchangeable and can be used in accordance with the preference of the die press manufacturer.

Thus, the die press of the present invention is provided with a die carriage having controls for the pressure member mounted thereon at a position which is remote from the path of vertical movement of the pressure member. The operator can position the die carriage and actuate the moving means of the pressure member without moving his hands from the die carriage and placing them on another portion of the die press. In addition, this configuration eliminates any possible safety hazard because it assures that the operator's hands will be out of the way of the pressure member at the time of activation thereof. Further, the die press of the present invention has a die carriage which is movable in three orthogonal directions, such that it can be placed anywhere relative to the support upon which the material is placed. The mechanical linkage provided connecting the die carriage to the die press contains a member to counterbalance a substantial portion of the weight of the die carriage and die to facilitate movement thereof. In addition, mechanical linkage assures that the die and die carriage will always be maintained in a plane substantially parallel to the surface of the support, such that a cut can be performed anywhere along the surface of the support.

While only a single preferred embodiment of the present invention has been described herein for purposes of illustration, it is apparent that many variations and modifications may be made to the particular structure disclosed. It is intended to cover all of these variations and modifications which fall within the scope of the present invention as defined by the following claims:

What is claimed is:

1. A die press for performing operations on material comprising a support upon which the material is placed, a pressure member, said member being movable toward and away from said support, means for moving said member, means for controlling said moving means, a die, a die carriage upon which said die is mounted, said carriage being situated between said member and said support and being movable relative to said support, said controlling means being situated on said die carriage at a portion thereof remote from the path of movement of said member.

2. The press of claim 1 wherein said controlling means comprise switch means, said switch means requiring actuation in order to energize said moving means.

3. The press of claim 1 wherein said controlling means comprises a pair of switch means, said switch means requiring simultaneous actuation in order to energize said moving means.

4. In the press of claim 1, a handle member, said controlling means being situated on said handle member or said die carriage.

5. In the press of claim 3 a pair of spaced handle members on said die carriage, said switches being located on each of said members, respectively.

6. The press of claim 1 wherein said carriage is movable relative to said support in a first, a second and a third direction.

7. The press of claim 6 wherein said first direction is the same direction as the movement of said pressure member.

8. The press of claim 1 further comprising means for maintaining said carriage in a plane substantially parallel to the plane of said support throughout movement thereof.

9. The press of claim 3 further comprising means for maintaining said carriage in a plane substantially parallel to the plane of said support throughout movement thereof.

10. The press of claim 6 further comprising means for maintaining said carriage in a plane substantially parallel to the plane of said support throughout movement thereof.

11. A die press for performing operations on material comprising a support upon which the material is placed, a pressure member, said member being movable toward and away from said support and, additionally, movable in a plane parallel to said support, a die, a die carriage upon which said die is mounted, said die carriage being located between said member and said support, and movable in a first, a second and a third direction relative to said support, said first direction being parallel to the direction of movement of said pressure member toward and away from said support, and means for maintaining said die carriage in a plane substantially parallel to the plane of said support throughout the movement thereof.

* * * * *